US011760001B2

(12) United States Patent
Swanson et al.

(10) Patent No.: US 11,760,001 B2
(45) Date of Patent: Sep. 19, 2023

(54) FILAMENT SUPPLY WITH SEALED CONNECTOR FOR USE WITH A 3D PRINTER

(71) Applicant: Stratasys, Inc., Eden Prairie, MN (US)

(72) Inventors: William J. Swanson, St. Paul, MN (US); Brett Johnson, Roseville, MN (US)

(73) Assignee: Stratasys, Inc., Eden Prairie, MN (US)

( * ) Notice: Subject to any disclaimer, the term of this patent is extended or adjusted under 35 U.S.C. 154(b) by 382 days.

(21) Appl. No.: 16/834,804

(22) Filed: Mar. 30, 2020

(65) Prior Publication Data

US 2020/0307070 A1   Oct. 1, 2020

Related U.S. Application Data

(60) Provisional application No. 62/826,578, filed on Mar. 29, 2019.

(51) Int. Cl.
*B29C 64/118* (2017.01)
*B29C 64/255* (2017.01)
(Continued)

(52) U.S. Cl.
CPC .......... *B29C 64/118* (2017.08); *B29C 64/209* (2017.08); *B29C 64/255* (2017.08);
(Continued)

(58) Field of Classification Search
CPC ... B29C 64/118; B29C 64/209; B29C 64/255; B29C 64/336; B29C 64/386;
(Continued)

(56) References Cited

U.S. PATENT DOCUMENTS 4,802,864 A * 2/1989 Michaels ........... H01R 13/5219
439/457
5,121,329 A     6/1992 Crump
(Continued)

FOREIGN PATENT DOCUMENTS

CN      207044697 U    2/2018
CN      305362203      3/2019
(Continued)

OTHER PUBLICATIONS

International Search Report and Written Opinion from International Application No. PCT/US2019/061524, dated Jun. 8, 2020.
(Continued)

*Primary Examiner* — Joseph S Del Sole
*Assistant Examiner* — Baileigh Kate Darnell
(74) *Attorney, Agent, or Firm* — Peter J. Ims; Westman, Champlin & Koehler, P.A.

(57)    ABSTRACT

A consumable assembly for supplying filament to a 3D printer having two or more receptacles having different geometric configurations, the 3D printer builds parts by material extrusion. The consumable assembly includes a container configured to retain a supply of a first filament, and a first filament guide tube having a length, the first filament guide tube having an inlet end attached to the first container and an outlet end, The consumable assembly includes a key having a geometric configuration allowing the key to be plugged into only one receptacle of the two or more receptacles of the 3D printer, the key comprising a conduit having an entrance and an exit, a coupling portion, and an engagement portion, wherein the entrance to the conduit is coupled to the outlet end of the first filament guide tube to thereby form a closed filament path from the first container to the 3D printer.

21 Claims, 8 Drawing Sheets

(51) Int. Cl.
  *B29C 64/336* (2017.01)
  *B33Y 10/00* (2015.01)
  *B33Y 30/00* (2015.01)
  *B33Y 40/00* (2020.01)
  *B29C 64/386* (2017.01)
  *B29C 64/209* (2017.01)
  *B33Y 50/00* (2015.01)

(52) U.S. Cl.
  CPC .......... *B29C 64/336* (2017.08); *B29C 64/386* (2017.08); *B33Y 10/00* (2014.12); *B33Y 30/00* (2014.12); *B33Y 40/00* (2014.12); *B33Y 50/00* (2014.12)

(58) Field of Classification Search
  CPC ....... B29C 64/321; B33Y 10/00; B33Y 30/00; B33Y 40/00; B33Y 50/00
  See application file for complete search history.

(56) References Cited

U.S. PATENT DOCUMENTS

| | | |
|---|---|---|
| 5,181,433 A | 1/1993 | Ueno et al. |
| 5,340,433 A | 8/1994 | Crump |
| 5,503,785 A | 4/1996 | Crump et al. |
| 6,004,124 A | 12/1999 | Swanson et al. |
| 6,022,207 A | 2/2000 | Dahlin et al. |
| 6,547,995 B1 | 4/2003 | Comb |
| 6,722,872 B1 | 4/2004 | Swanson et al. |
| 6,923,634 B2 | 8/2005 | Swanson et al. |
| 7,063,285 B1 | 6/2006 | Turley et al. |
| 7,127,309 B2 | 10/2006 | Dunn et al. |
| 7,329,128 B1* | 2/2008 | Awad ................ H01R 13/6205 439/38 |
| 7,367,087 B2 | 5/2008 | Colombo et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,891,964 B2 | 2/2011 | Skubic et al. |
| 7,896,209 B2 | 3/2011 | Batchelder et al. |
| 7,897,074 B2 | 3/2011 | Batchelder et al. |
| 7,910,041 B1 | 3/2011 | Priedeman, Jr. |
| 7,938,356 B2 | 5/2011 | Taatjes et al. |
| 8,403,658 B2 | 3/2013 | Swanson |
| 8,419,996 B2 | 4/2013 | Swanson et al. |
| 8,439,665 B2 | 5/2013 | Batchelder et al. |
| 8,465,111 B2 | 6/2013 | Swanson et al. |
| 8,512,024 B2 | 8/2013 | Pax |
| 8,647,102 B2 | 2/2014 | Swanson et al. |
| 8,926,882 B2 | 1/2015 | Batchelder et al. |
| 8,985,497 B2 | 3/2015 | Mannella et al. |
| 9,073,263 B2 | 7/2015 | Mannella et al. |
| 9,108,360 B2 | 8/2015 | Comb et al. |
| 9,168,699 B2 | 10/2015 | Pax |
| 9,233,504 B2 | 1/2016 | Douglas et al. |
| 9,321,609 B2 | 4/2016 | Koop et al. |
| 9,512,544 B2 | 12/2016 | Heikkila |
| 9,893,591 B2 | 2/2018 | Farley et al. |
| 10,022,917 B2 | 7/2018 | Pax |
| 10,494,219 B2 | 12/2019 | Nadeau et al. |
| 10,513,104 B2 | 12/2019 | Barclay et al. |
| 10,513,107 B2 | 12/2019 | Flannigan et al. |
| 10,870,149 B2 | 12/2020 | Oftedal |
| D938,258 S | 12/2021 | Johnson |
| D938,259 S | 12/2021 | Johnson |
| 11,267,199 B2 | 3/2022 | Smith et al. |
| 2008/0213419 A1 | 9/2008 | Skubic et al. |
| 2009/0141477 A1 | 6/2009 | Bhosale et al. |
| 2009/0295153 A1* | 12/2009 | Knapp ................ F16L 25/0036 285/331 |
| 2010/0096485 A1 | 4/2010 | Taatjes et al. |
| 2010/0283172 A1 | 11/2010 | Swanson |
| 2013/0164960 A1 | 6/2013 | Swanson et al. |
| 2014/0120196 A1 | 5/2014 | Schmehl |
| 2014/0159273 A1 | 6/2014 | Koop et al. |
| 2014/0276649 A1* | 9/2014 | Ivosevic ................ A61M 39/14 604/533 |
| 2015/0084222 A1 | 3/2015 | Heston et al. |
| 2015/0108677 A1 | 4/2015 | Mark et al. |
| 2015/0140145 A1 | 5/2015 | Schmehl et al. |
| 2017/0057168 A1 | 3/2017 | Miller et al. |
| 2017/0173879 A1 | 6/2017 | Myerberg et al. |
| 2017/0361501 A1 | 12/2017 | van der Zalm et al. |
| 2018/0027615 A1 | 1/2018 | Rios et al. |
| 2018/0043627 A1 | 2/2018 | Barclay et al. |
| 2018/0154586 A1 | 6/2018 | Wang et al. |
| 2018/0290365 A1 | 10/2018 | Noorazar et al. |
| 2018/0304533 A1 | 10/2018 | Burnham et al. |
| 2018/0319079 A1 | 11/2018 | Eyal et al. |
| 2018/0345597 A1 | 12/2018 | Wilenski et al. |
| 2019/0091929 A1 | 3/2019 | Harrison et al. |
| 2019/0152154 A1 | 5/2019 | Mantell |
| 2020/0001590 A1 | 1/2020 | Holland |
| 2020/0002121 A1 | 1/2020 | Manuel et al. |
| 2020/0031046 A1 | 1/2020 | Gjovik et al. |
| 2020/0044393 A1 | 2/2020 | Nishikawa |
| 2020/0130231 A1 | 4/2020 | Ruckborn et al. |
| 2020/0130277 A1 | 4/2020 | Thorpe et al. |
| 2020/0215750 A1 | 7/2020 | Long |
| 2020/0282644 A1 | 9/2020 | Smith |
| 2020/0282651 A1 | 9/2020 | Chu et al. |
| 2020/0307070 A1 | 10/2020 | Swanson et al. |
| 2020/0307081 A1 | 10/2020 | Mantell et al. |
| 2021/0069789 A1 | 3/2021 | Moosberg et al. |
| 2022/0016837 A1 | 1/2022 | PeKarna et al. |

FOREIGN PATENT DOCUMENTS

| | | |
|---|---|---|
| CN | 305603635 | 6/2019 |
| CN | 306423288 | 9/2020 |
| CN | 306403296 | 10/2020 |
| DE | 402015000024-0017 | 1/2015 |
| EM | 002882795-001 | 11/2015 |
| EP | 2117793 A1 | 11/2009 |
| WO | 0189714 A1 | 11/2001 |
| WO | 2008100467 A1 | 8/2008 |
| WO | 2020102569 A2 | 5/2020 |

OTHER PUBLICATIONS

Communication pursuant to Rules 161(1) and 162 EPC from European Patent Application No. 19820930.6, dated Jun. 22, 2021.
First Office Action from Chinese Patent Application No. 201990001142.6 dated Dec. 9, 2021.
Bigtreetech Direct, MK8 CR10 Extruder Heatsink, Date first available Jun. 10, 2020 [online] retrieved Apr. 16, 2021, available from https://www.amazon.com/dp/B089YV5KNQ/ref-=sspa_dk_detail_9?osc=1&pd_rd_i=B089YV5KNQ&pd_rd_w=H6cMx&pf_rd_p=085568d9-3b13-4ac1-8 (Year: 2020).
Gulfcoast Robotics, Hotend Conversion, Date first available Nov. 5, 2019, [online] retrieved Apr. 16, 2021, available from https://www.amazon.com/Gulfcoast-Robotics-Conversion-Polished-Heatbreak/dp/B0811NWV2F/ref=pd_sbs_49?pd_rd_w=L7ysp&pf_rd_p=651d64d (Year: 2019).
Polisi3d, Extruder Titan, Extruder 3D Printer, Date first available Jul. 11, 2020, [online] retrieved Apr. 16, 2021, available from https://www.amazon.com/Dragonfly-Bimetal-Heatbreak-Upgrade-Extruder/dp/B08N6TBDT8/ref=pd_sbs_55?pd_rd_w=L7ysp&pf_rd_p=651d64d1-3c73-45b6-ae09-e545600e3a22&pf_rd_r=GE2C7S1ZJNG9G (Year: 2020).
International Search Report and Written Opinion from International Application No. PCT/US2019/061524, filed Nov. 14, 2019.

* cited by examiner

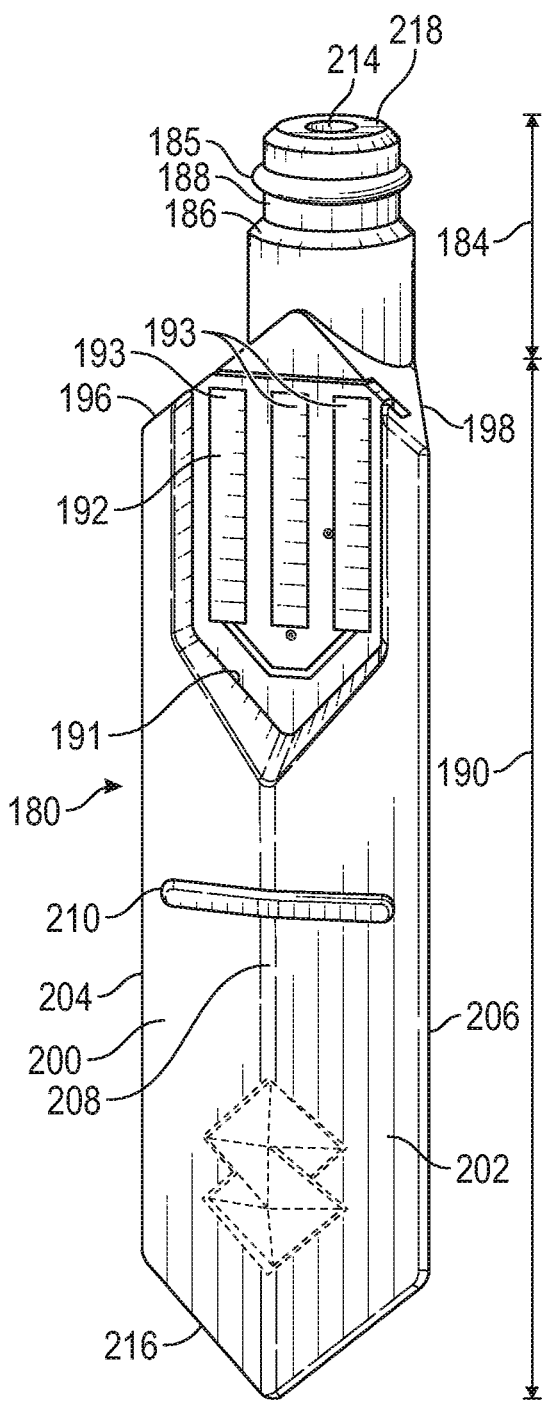
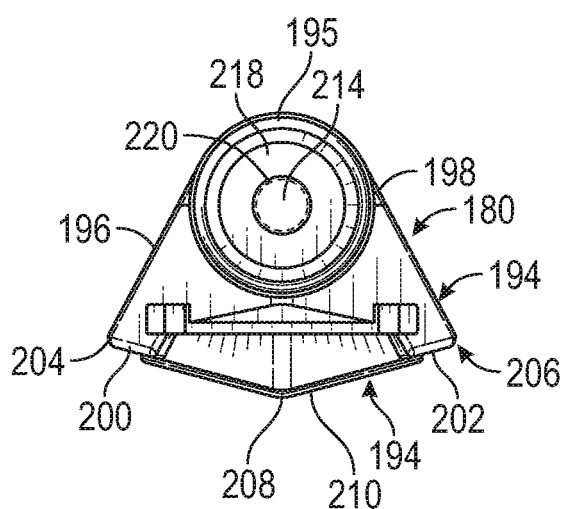
FIG. 3
FIG. 4

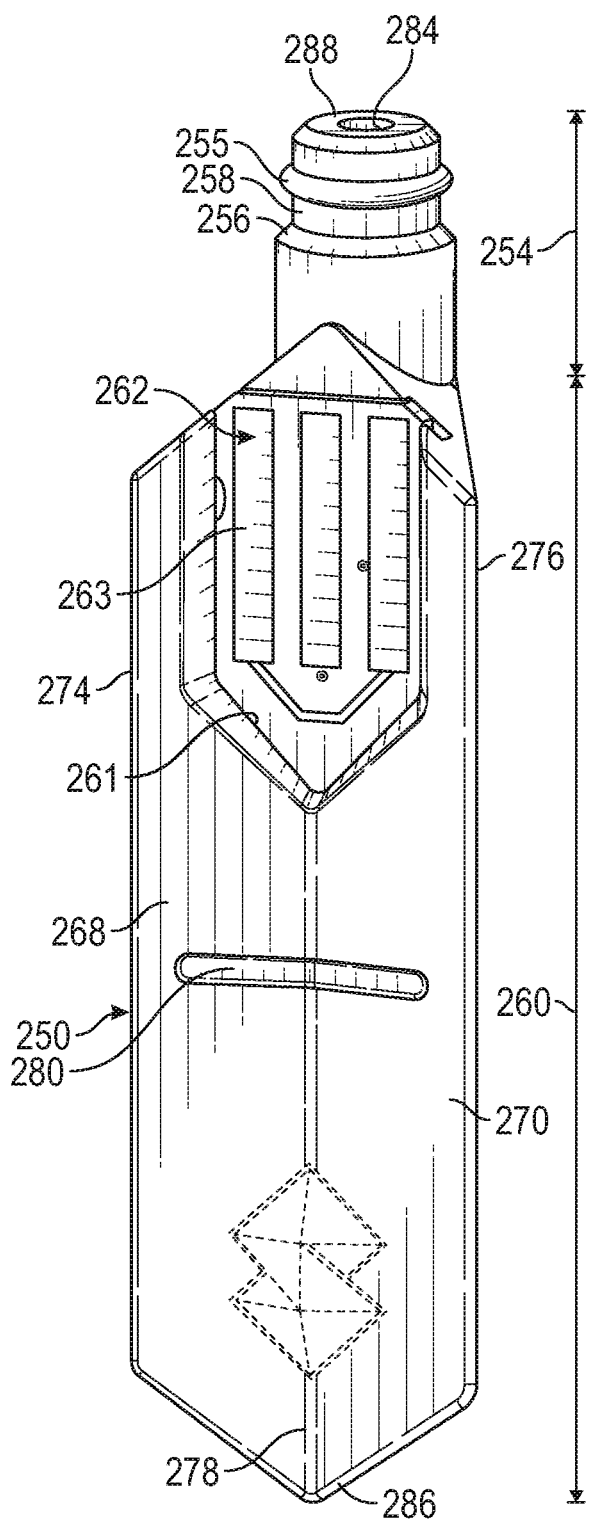
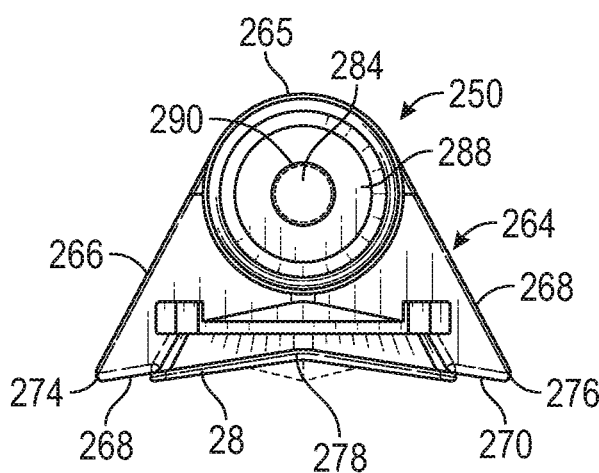
FIG. 5
FIG. 6

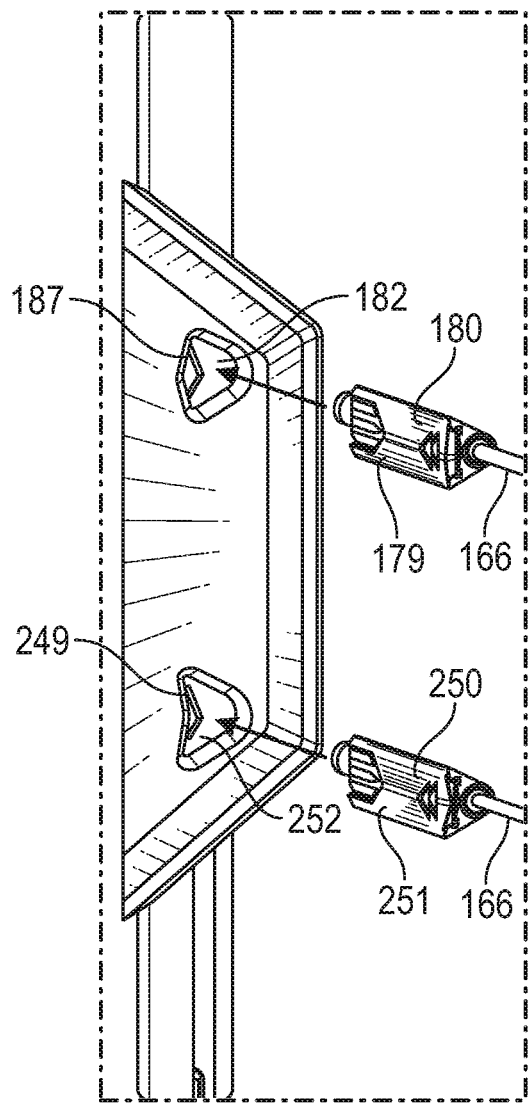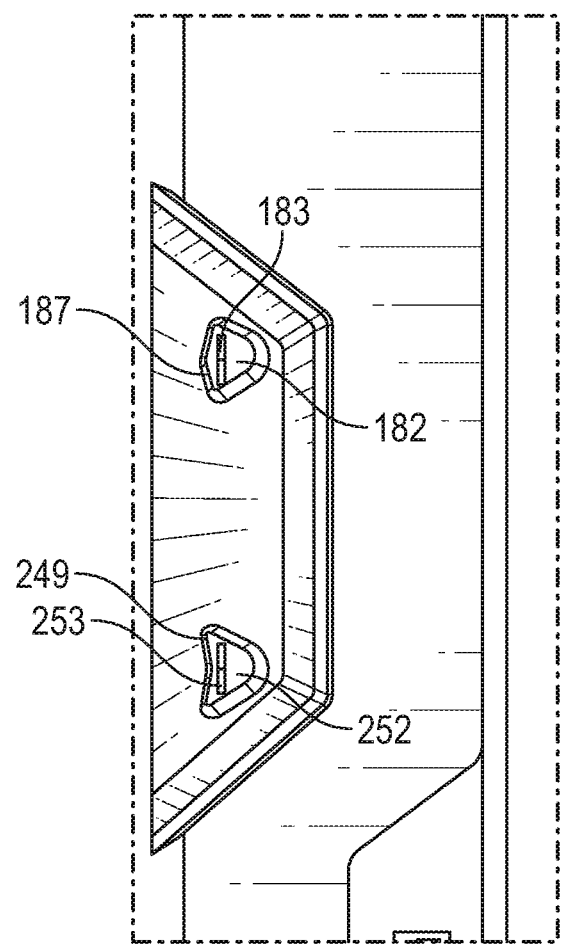
FIG. 7
FIG. 8

FILAMENT SUPPLY WITH SEALED CONNECTOR FOR USE WITH A 3D PRINTER

CROSS REFERENCE TO RELATED APPLICATION(S)

The present application claims the benefit of U.S Provisional Patent Application Ser. No. 62/826,578 entitled FILAMENT GUIDE TUBE WITH SEALED CONNECTOR FOR USE WITH AN ADDITIVE MANUFACTURING SYSTEM that was filed on Mar. 29, 2019, the contents of which are incorporated by reference in its entirety.

BACKGROUND

The present disclosure relates to additive manufacturing systems for 3D printing of parts by material extrusion techniques. In particular, the present disclosure relates to 3D printing of parts with filament feedstock materials supplied from a filament supply that is detachable from the 3D printer. All references disclosed herein are incorporated by reference.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a 3D part in a single build plane, the geometry of part features may be used to determine the orientation of printing.

Many materials used to print parts and related support material are hygroscopic, meaning the materials absorb moisture from the ambient environment. There is a need to prevent moisture from entering into the feed path of the filament and ensuring that the proper material feedstock is provided to the correct print head of an additive manufacturing system.

SUMMARY

An aspect of the present disclosure is directed to an additive manufacturing system. The additive manufacturing system includes a 3D printer having a first and a second print head each configured to receive a filament, melt the filament, and deposit the melted filament to form a 3D part, and having a first receptacle and a second receptacle each configured for accepting a plug-in connector from a filament supply, where the first and second receptacles having different geometric configurations. The system includes a first filament supply. The first filament supply includes a first container configured to retain a supply of a first filament and a first filament guide tube having a length, the first filament guide tube having an inlet end attached to the first container and an outlet end. The first filament supply further includes a first key having a first geometric configuration allowing the first key to be plugged into the first receptacle and comprising a conduit having an entrance and an exit, a coupling portion, and an engagement portion, wherein the entrance to the conduit is coupled to the outlet end of the first filament guide tube to thereby form a closed filament path from the first container to the 3D printer. The system further includes a second filament supply comprising. The second filament supply includes a second container configured to retain a supply of a second filament, the second filament being a different from the first filament. The second filament supply includes a second filament guide tube having a length, the second filament guide tube having an inlet end attached to the second container and an outlet end. The second filament supply includes a second key having a second geometric configuration allowing the second key to be plugged into the second receptacle and comprising a conduit having an entrance and an exit, a coupling portion, and an engagement portion, wherein the entrance to the conduit is coupled to the outlet end of the second filament guide tube to thereby form a closed filament path from the second container to the 3D printer, wherein allows the second key to be plugged into the second receptacle. The first geometric configuration of the first key prevents the first key from being plugged into the second receptacle and the second geometric configuration of the second key prevents the second key from being plugged into the first receptacle.

Another aspect of the present disclosure relates a consumable assembly for supplying filament to a 3D printer having two or more receptacles having different geometric configurations, where the 3D printer builds parts by material extrusion. The consumable assembly includes a container configured to retain a supply of a first filament, and a first filament guide tube having a length, the first filament guide tube having an inlet end attached to the first container and an outlet end, The consumable assembly includes a key having a geometric configuration allowing the key to be plugged into only one receptacle of the two or more receptacles of the 3D printer, the key comprising a conduit having an entrance and an exit, a coupling portion, and an engagement portion, wherein the entrance to the conduit is coupled to the outlet end of the first filament guide tube to thereby form a closed filament path from the first container to the 3D printer.

Another aspect of the present disclosure relates to a method of feeding consumable filament material to a 3D printer. The method includes providing a filament supply comprising a filament coil within a container, a filament guide tube coupled to the container at an inlet end thereof, and a connector coupled to the guide tube at an outlet end thereof, wherein a conduit through the filament guide tube and the connector form a closed filament feed path. The method includes coupling the filament supply to the 3D printer by inserting the connector into a mating receptacle of the 3D printer and forming a seal between the connector and the receptable. The method further includes feeding filament to the 3D printer by advancing filament from the filament coil along the closed filament feed path and through the connector. The connector is of a unitary construction of an elastomeric material having a Shore A hardness ranging from about 30 to about 95 having a through bore configured to accept an outlet end of the filament guide tube and form a seal therewith and having a constricted wiper seal configured to allow the filament to pass therethrough while form a seal with the filament. The method further includes receiving the filament in the print head. heating the filament in the print head to a flowable state, and selectively extruding the filament in the flowable state to form a 3D part.

BRIEF DESCRIPTION OF THE DRAWINGS

FIG. 3 is a perspective view of a key for a consumable assembly.

FIG. 4 is a front view of the key of FIG. 3.

FIG. 5 is a perspective view of another key for a consumable assembly.

FIG. 6 is a front view of the key of FIG. 5.

FIG. 7 is a view of two different keys and receptacles.

FIG. 8 is a view of two different keys and receptacles.

DETAILED DESCRIPTION

Figure 1:
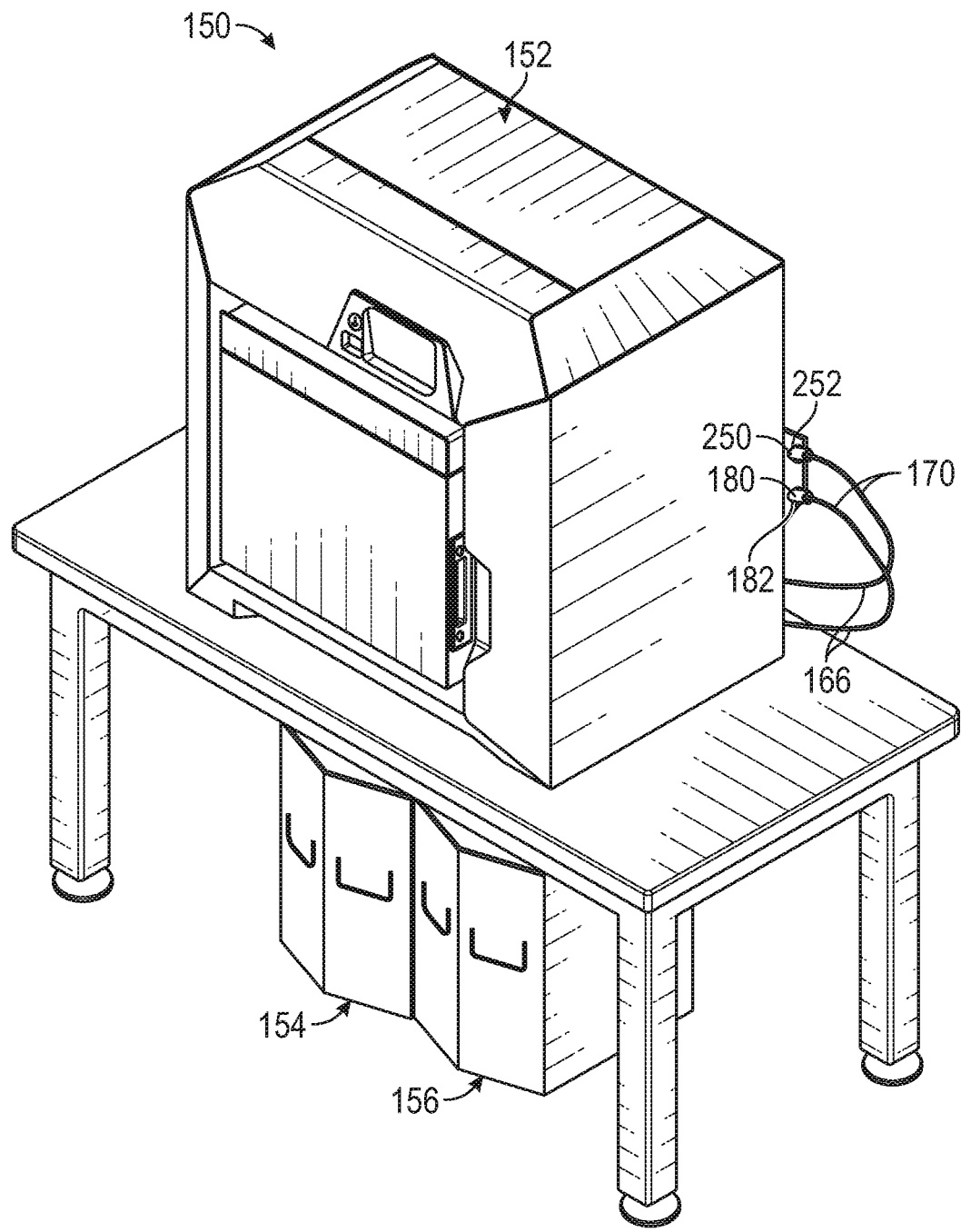
FIG. 1 is a perspective view of an exemplary additive manufacturing system.

The present disclosure is directed to filament guide tube for connecting a filament supply to a 3D printer of an additive manufacturing system. The filament guide tube is connected to the filament supply at an inlet end and an outlet end includes a unitary or monolithic elastomeric connector or key that is configured to be positioned within a receptacle in a 3D printer. When the unitary or monolithic elastomeric connector or key is inserted into a mating receptacle of a 3D printer, the elastomeric connector or key forms a seal with the receptacle to prevent ambient air and moisture from entering in the filament feed path through the receptacle. What is meant by unitary or monolithic is that the elastomeric portion of the connector or key is a single piece that is typically formed through a molding process. In this application unitary and monolithic can be used interchangeably.

The elastomeric connector or key creates a closed filament feed path from the filament supply, through the filament guide tube, and to the 3D printer. Filament may then be fed to the 3D printer by advancing filament from a filament supply (which contains a filament spool, filament coil, or the like), along the closed filament feed path and through the connector or key. The geometry and elastomeric properties of the connector or key retain it within the printer receptacle without need for additional retention mechanisms.

For uses of the elastomeric connector as a key for connecting the filament supply to a 3D printer, multiple keys are generated and provided, each having a unique geometry or configuration. Likewise, multiple receptacles are provided in the 3D printer, each receptacle having a configuration complimentary to the geometry of a key, such that each key can be positioned within a corresponding receptacle having a complementary configuration to that of the key. The key forms a seal with the receptacle without the need for any additional sealing members or added parts, such as an O-ring or a clamp. Additionally, the unique configuration or geometry of each key and the corresponding receptacle ensure that a selected feedstock material is utilized with the appropriate printer and print head; for example, using one key for build materials, and another for support materials. However, it is within the scope of the present disclosure to utilize a plurality of unitary keys having the same configuration with a 3D printer.

During the molding process, the elastomeric member or key can be optionally formed with a colored material wherein the color is used to match with a color on the corresponding receptacle, to communicate the appropriate plug-in site. As such, the unique configuration of the elastomeric member or key and the color of the elastomeric member or key along with the complementary configuration and color of the receptacle ensure the desired feedstock material is fed into the machine, and ultimately to the desired part or support print head.

The molded, unitary elastomeric member or key has a through bore configured to accept the outlet end of the guide tube. The elastomeric material is sufficiently deformable to allow the guide tube to be positioned therein. When the outlet end of the guide tube is positioned within the through bore, a seal is formed between the guide tube and the elastomeric material of the key. The guide tube provides sufficient rigidity to the elastomeric member or key to allow the elastomeric member or key to be inserted into the desired receptacle, without overly bending or buckling while being positioned within the receptacle.

The monolithic elastomeric connector or key provides a seal with the receptacle and the guide tube without any additional sealing member, and therefore increasing the effectiveness or reliability of the seal. The elastomeric material allows for effective insertion capability while also relying on a friction fit created by the insertion of the deformable material in the receptacle. Additionally, the unique configuration or geometry of the elastomeric member or key and the associated receptacle increases the likelihood that the desired feedstock is supplied to the appropriate print head and minimizes the likelihood that an undesired feedstock is supplied to the appropriate print head. Also, the optional use of color on the elastomeric member or key and the color of the associated receptacle increases the likelihood that the desired feedstock is supplied to the desired print head and minimizes the likelihood that an undesired feedstock is supplied to the desired print head.

Figure 2:
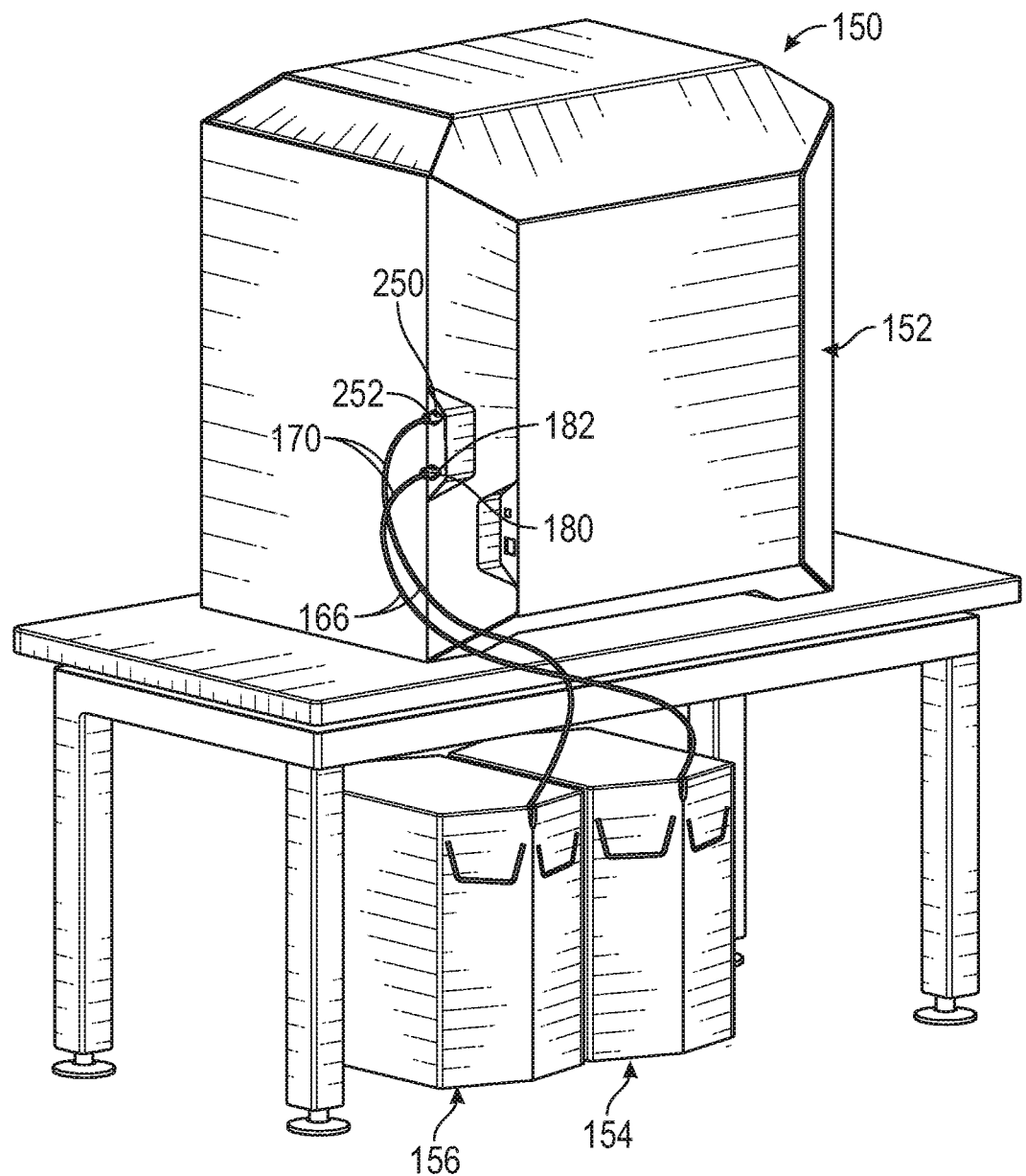
FIG. 2 is another perspective view of the exemplary additive manufacturing system.

Referring to FIGS. 1 and 2, a schematic view of an additive manufacturing system is illustrated at 150. The additive manufacturing system 150 includes a 3D printer 152 and consumable assemblies 154 and 156, where consumable assemblies 154 and 156 are positioned external from the 3D printer 152, outside of any humidity-controlled build environment. As illustrated, the consumable assembles 154 and 156 are located below the 3D printer 152 to minimize the footprint of the additive manufacturing system 150 which allows the density of systems 150 within a location to be increased. However, the present disclosure is not limited to consumable assemblies 154 and 156 located below the 3D printer 152. The present disclosure includes one or more consumable assemblies supplying a filament feedstock in any location external to the printer or within bays or shelves integral with the 3D printer 152, or within a humidity-controlled chamber.

Figure 10:
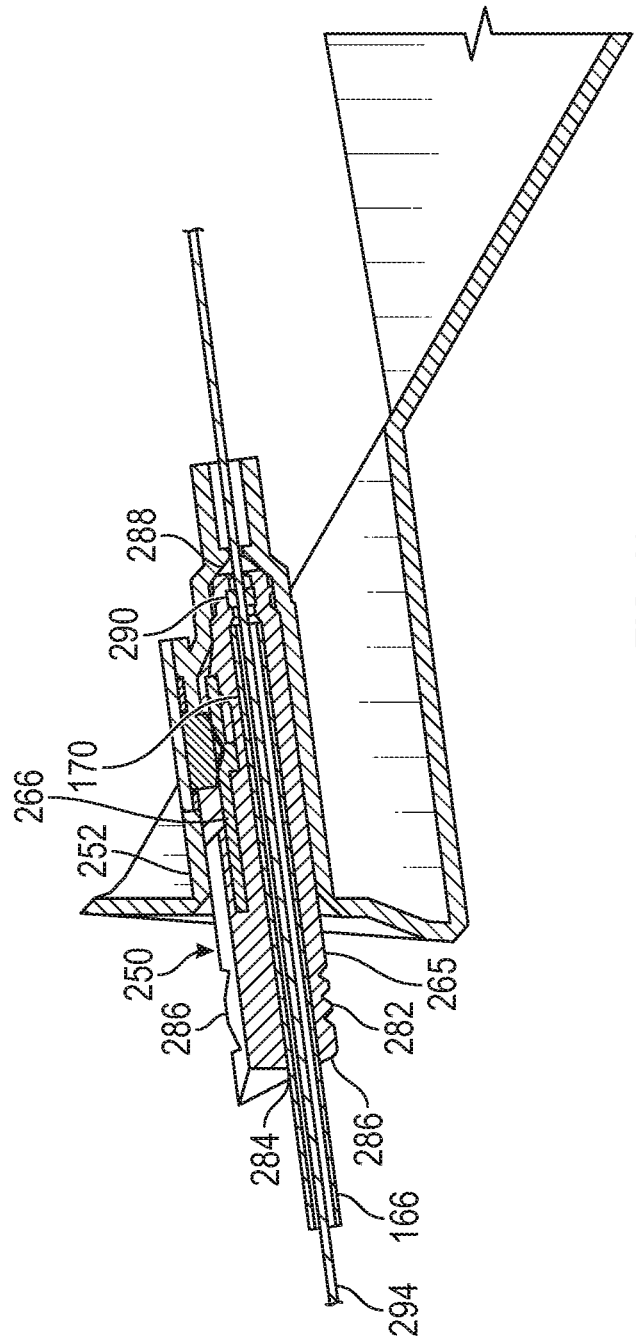
FIG. 10 is a section view of the key of FIGS. 5 and 6 within a corresponding receptacle.
Figure 11:
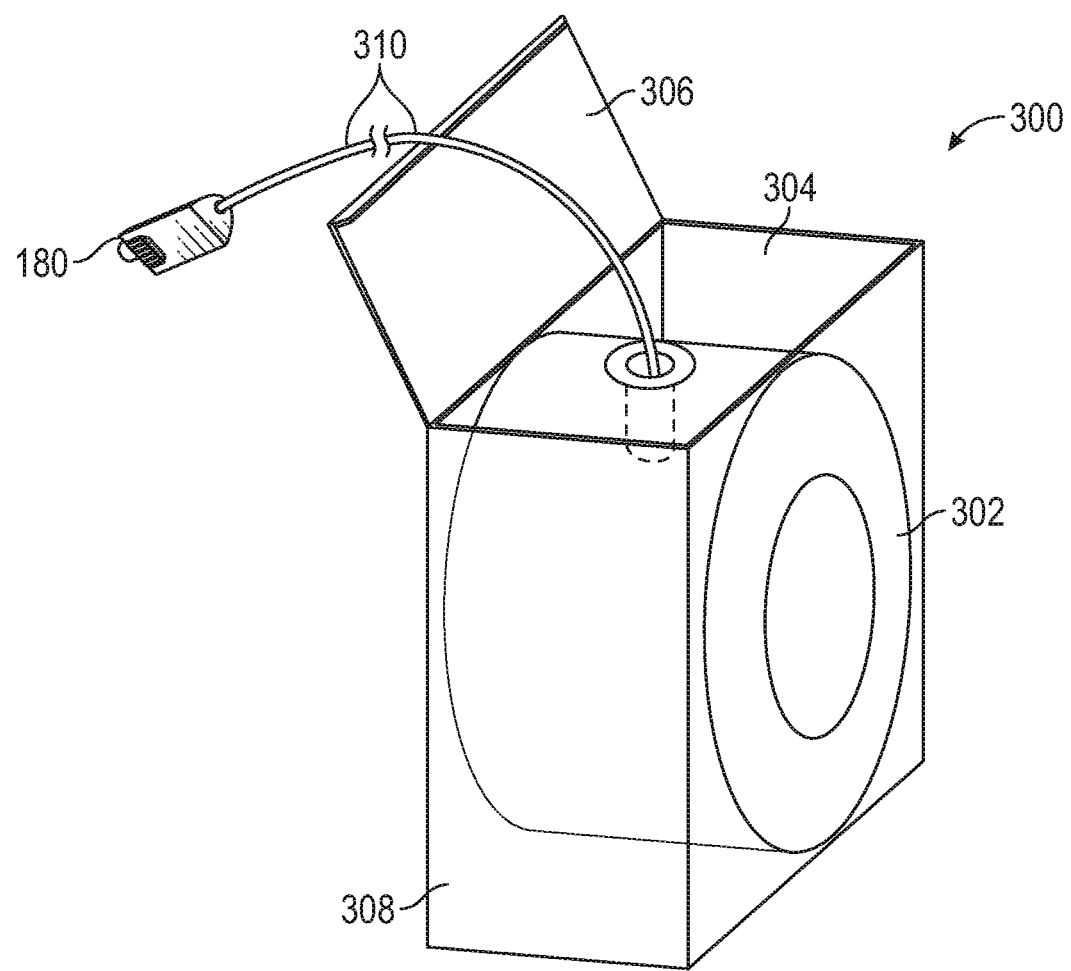
FIG. 11 is a perspective view of an exemplary consumable assembly.

The consumable assemblies 154 and 156 each include a guide tube 166 that connects a filament supply provided within a container (for example, filament supply 302 within container 308, as illustrated in FIG. 11) to receptacles 182 and 252 of the 3D printer. Each guide tube 166 is a flexible tubing that defines a filament feed path from the filament supply at an inlet end thereof, to the connector or key at an outlet end thereof. Guide tube 166 is sealingly connected to either consumable assembly 154 or 156 at its inlet end, and is sealingly connected to an elastomeric connector or key 180 and 250 at an outlet end 170 (shown in FIGS. 9 and 10). Each consumable assembly 154 and 156 may retain the filament supply on a wound spool, a spool-less coil, or other supply arrangement, such as discussed for example in Turley et al. U.S. Pat. No. 7,063,285; Taatjes at al., U.S. Pat. No. 7,938,356; and Mannella et al., U.S. Pat. Nos. 8,985,497 and 9,073,263, the contents of which are incorporated by reference in their entireties. In some embodiments, one or more sensors are located in the guide tube assembly 166 to monitor humidity levels along the feed path.

The additive manufacturing system 150 is configured to print parts and support structure where necessary in a layer-wise manner. Exemplary 3D printer 152 prints parts or models and corresponding support structures from filament supplied by consumable assemblies 154 and 156 by extruding roads of molten material along toolpaths. During a build operation, successive segments of consumable filament are driven into an appropriate print head with a filament drive, where they are heated and melted in a print head liquefier. The melted material is extruded through a print head nozzle tip in a layer-wise pattern to produce printed parts. In some embodiments, the print heads move in a plane and a build platen is moved along a print axis to print the part and support structure. In other embodiments, three-dimensional tool paths can be utilized. In some embodiments, a robotic that moves in five or more degrees of freedom to print the part. Typically, the additive manufacturing system 150 will print both part material and support material, and each of consumable assemblies 154 and 156 will respectively supply either part material filament or support material filament to a print head designed to print either part material or support material. Suitable 3D printers 152 include fused deposition modeling systems developed by Stratasys, Inc., Eden Prairie, Minn. under the trademark "FDM".

In some embodiments, the system 150 includes a heated chamber. In other embodiments, the chamber is not heated or can be omitted for printing in out of oven environments.

Each elastomeric connector or key 180 or 250 has a different configuration or shape, and each is configured or shaped to be positioned within an associated receptacle 182 and 252 having a complementary configuration. Optionally, the elastomeric connector or keys 180 and 250 and the associated receptacles 182 and 252 of the 3D printer 152 may have different colors to further aid in associating the correct feedstock supply 154 and 156 with the associated receptacle 182 and 252 and therefore print head having a filament drive mechanism, which ensures proper part material and/or support material is utilized to print the part. The elastomeric materials used to form the keys 180 and 250 have a Shore A hardness in the range of about 30 to about 95.

Figure 9:
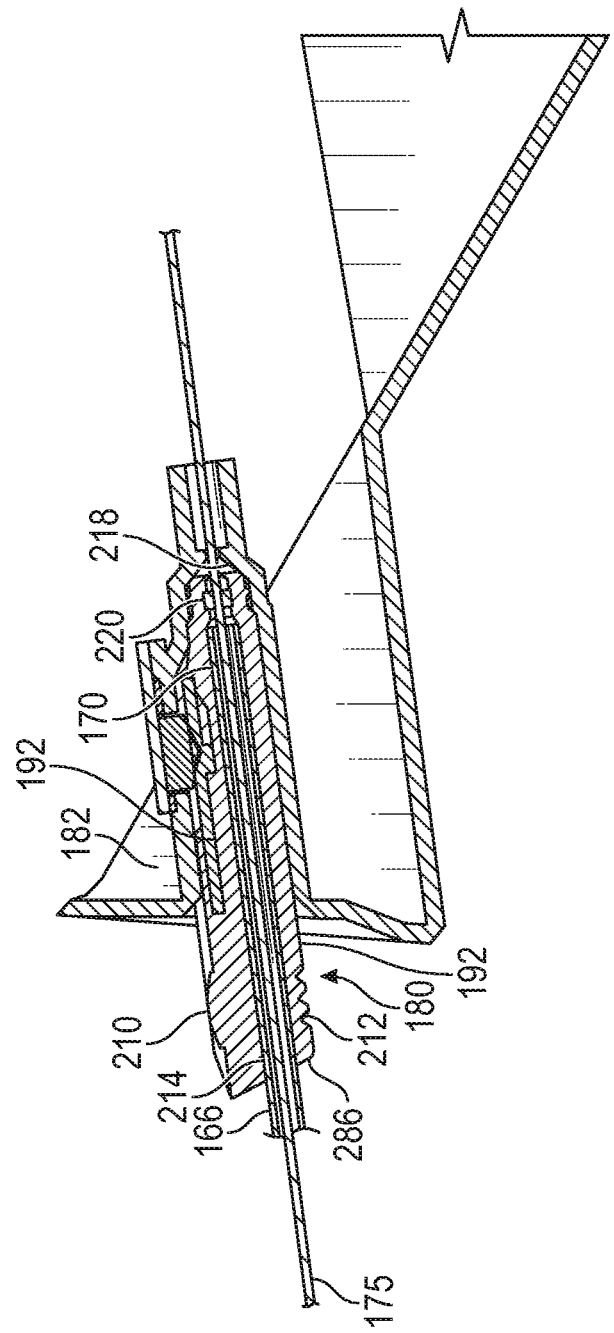
FIG. 9 is a sectional view of the key of FIGS. 3 and 4 within a corresponding receptacle.

Referring to FIGS. 3, 4, and 9, the key 180 is illustrated for mating with receptacle 182 and providing a filament strand 175 to the 3D printer through an exit 218. Key 180 is formed of an elastomeric material, and in some embodiments is of a unitary construction such as may be formed through a molding process, to avoid air leaks at connections or seams. A conduit 214 extends through key 180 as a pathway for filament, from a back end 216 to the exit 218 thereof.

The key 180 comprises a coupling portion 184 at exit 218. Coupling portion 184 has a ridge 185 about a circumference and a front shoulder 186 about the circumference, where the ridge 185 and the shoulder 186 define an annular groove 188, and the ridge 185 acts as an O-ring or protrusion. This protrusion serves as a friction fit seal into the receptacle, preventing ambient air infiltration, and thus, exposure of the filament to atmospheric moisture conditions.

The key 180 further comprises an engagement portion 190 that is configured to be gripped by a person for inserting into the receptacle 182. The engagement portion 190 includes a recess 191 which guides the user to insert the key 180 into the receptacle 182 to the depth necessary to effectively engage it into the printer. In the illustrated embodiment, the engagement portion 190 also includes a circuit board 192 that is secured into recess 191, where the circuit board 192 is retained within the recess due to the geometry of the circuit board 192 and the recess 191. The circuit board 192 does not require additional attaching mechanisms to reliably secure it into the elastomeric key, but rather is embedded into the elastomeric body of the key. The circuit board 192 can include and communicate information to the printer about the type of material, the diameter of the filament and/or the remaining length of the filament in the feedstock supply 154, by way of non-limiting example, such as is described in Stratasys U.S. Pat. No. 6,022,207 and MakerBot U.S. Pat. No. 9,233,504, the contents of which are incorporated by reference in their entireties. The filament key with embedded circuit board can be inserted into the complementary receptacle, and held in place with a friction fit, due to the flexible and elastomeric nature of the key.

Referring to FIGS. 7 and 8, when inserted into the receptacle 182, contacts 193 on the circuit board 192 engage contacts 183 in the receptacle 182 to allow the circuit board 182 to communicate with the controller or computer of the additive manufacturing system 150. In other embodiments, the circuit board 192 can be secured elsewhere on the key 180 in other manners that will provide a communication with the printer, or can be omitted if the printer does not require or utilize the circuit board functionality.

Referring back to FIGS. 3 and 4, the engagement portion 190 of the key 180 includes an arcuate surface 193 (conforming to a semi-circular contour of conduit 214) that transitions to a polygonal portion 194 having bottom surfaces 196 and 198 sloping downwardly from the arcuate surface 193 The polygonal portion 194 includes upper surfaces 200 and 202 joined to bottom surfaces 196 and 198 at edges 204 and 206. The upper surfaces 200 and 202 define an apex 208 extending a length of the engagement portion 190 from back end 216 to recess 191. Taken in cross-section, the engagement portion 190 has a cross-section that is substantially diamond shaped with the arcuate surface 193 located at one corner of the diamond. In embodiments where the printer 252 had multiple receptacles having unique geometries, the polygonal portion 194 provides the receptacle specific keying functionality, by providing a unique geometry as compared to the polygonal portion of other keys (e.g., key 250).

The upper surfaces 200 and 202 include a rib 210 that crosses the apex 208 to provide a gripping surface. The arcuate surface 193 includes a plurality of recess 212, shown in FIG. 10, that are also configured to increase a person's ability to grip the key 180.

The conduit 214 extending through key 180 is configured to accept the outlet end 170 of the guide tube 166 at the back end 216 of the key 180, in the engagement portion 190. A seal is formed between the outer surface of the guide tube 166 and the key 180 about the conduit 214. The guide tube 166 is sufficiently rigid to provide rigidity to the key 180 to allow the elastomeric key 180 to be manipulated without excessive flex, bending or buckling during insertion.

The key 180 may optionally include a wiper seal 220 within the key 180 proximal the front end 218 that constricts the conduit 214 a portion of the diameter that is not taken up by the filament. The wiper seal 220 includes an aperture that is sized to engage an outer surface of the filament strand 175 while allowing the filament strand 175 to pass there-though without excessive resistance. The wiper seal 220 is utilized to prevent ambient air and moisture from engaging the filament strand 175 and entering the guide tube 166 and the consumable assembly. The inner diameter of the guide tube 166 is larger than the diameter of the filament strand 175 so as to allow the filament strand to pass through the guide tube without created excessive frictional forces.

Referring to FIGS. 5, 6 and 10, the key 250 is illustrated for mating with receptacle 252 and providing a filament strand to the 3D printer through an exit 288. Key 250 is formed of an elastomeric material, and in some embodiments is of a unitary construction such as may be formed through a molding process, to avoid air leaks at connections or seams. A conduit 284 extends through key 250 as a pathway for filament, from a back end 286 to the exit 288 thereof.

The key 250 further comprises an engagement portion 260 that is configured to be gripped by a person for inserting into the receptacle 252. The engagement portion 260 includes a recess 261 which guides the user to insert the key 250 into the receptacle 252 to the depth necessary to effectively engage it into the printer. In the illustrated embodiment, the engagement portion 260 includes a circuit board 262 that is secured into recess 261 where the circuit board 262 is retained within the recess due to the geometry of the circuit board 262 and the recess 261. The circuit board 262 does not require additional attaching mechanisms to reliably secure it into the elastomeric key, but rather, it is embedded into the elastomeric body of the key. The filament key with embedded circuit board can be inserted into the complementary receptacle, and held in place with a friction fit, due to the flexible and elastomeric nature of the key.

When key 250 is inserted into the receptacle 252, contacts 263 on the circuit board 262 engage contacts 253 in the receptacle 252 to allow the circuit board 262 to communicate with the controller or computer of the additive manufacturing system 150 as best illustrated in FIGS. 9 and 10. The circuit board 262 can provide information to the printer about the type of material, the diameter of the filament and/or the length of the filament in the feedstock supply 156, by way of non-limiting example, such as is described in Stratasys U.S. Pat. No. 6,022,207 and MakerBot U.S. Pat. No. 9,233,504. In other embodiments, the circuit board 192 can be secured elsewhere on the key 180 in other manners that will provide a communication with the printer, or can be omitted if the printer does not require or utilize the circuit board functionality.

Referring back to FIGS. 5, 6 and 10, the engagement portion 260 of the key 250 includes an arcuate surface 265 having a rounded surface (conforming to a semi-circular contour of conduit 284) that transitions to a polygonal portion 264 having bottom surfaces 266 and 268 sloping downwardly from the arcuate surface 265. The polygonal portion 264 includes upper surfaces 270 and 272 joined to bottom surfaces 266 and 268 at edges 274 and 276. The upper surfaces 270 and 272 are sloped in the similar direction as that of surfaces 266 and 268 define a recess 278 extending a length of the engagement portion 260 from back end 286 to recess 261. Taken in cross-section, the engagement portion 260 has a cross-section that is polygonal with a concave configuration formed by surfaces 270 and 272 with arcuate surface 265 extending from one corner of the polygon. In embodiments where the printer 252 had multiple receptacles having unique geometries, the polygonal portion 264 provides the receptacle-specific keying functionality, by providing a unique geometry as compared to the polygonal portion of other keys (e.g., key 180).

The upper surfaces 270 and 272 include a rib 280 that crosses the recess 278 and provides a gripping surface. The arcuate surface 265 includes a plurality of recess 282, shown in FIG. 10, that are also configured to increase a person's ability to grip the key 250.

The conduit 284 extending through key 250 is configured to accept the outlet end 170 of the guide tube 166 at the back end 286 of the key 250, in the engagement portion 260. A seal is formed between the outer surface of the proximal end 170 of the guide tube 166 and the key 250 about the conduit 284. The guide tube 166 is sufficiently rigid to provide sufficient rigidity to the key 250 to allow the elastomeric key 250 to be manipulated without excessive flex, bending or buckling.

The key 250 optionally includes a wiper seal 290 within the conduit 284 proximal the exit 288. The wiper seal 290 constricts the diameter of the conduit 284 and engages an outer surface of a filament strand 294 located in the conduit 284 and forms a seal with the filament strand 275, while allowing the filament to pass there-though without excessive resistance. The wiper seal 290 is utilized to prevent ambient air and moisture from engaging the filament within the guide tube 166 and within the consumable assembly. Again, the inner diameter of the guide tube 166 is larger than the diameter of the filament strand 275 so as to allow the filament strand to pass through the guide tube without created excessive frictional forces.

FIGS. 7 and 8 illustrate the receptacles 182 and 152 and the connectors 180 and 250 acting as keys. The receptacle 182 includes a geometric configuration 187 that will accept the geometric configuration 179 of the key 180 and not the key 250. Similarly, the receptacle 252 includes a geometric configuration 149 that will accept the geometric configuration 251 of the key 250 and not the key 180. As such, a user is prevented from feeding the wrong material to a print head of the printer.

FIG. 9 is a cross sectional view of the key or connector 180 positioned within the receptacle 182. FIG. 9 illustrates a seal between the outer surface of the key 180 with the receptacle 182, a seal between the key 180 and the outlet end of the filament guide tube 166 and a seal between the filament 175 and the wiper seal 220. As such the key or connector 180 aids in preventing ambient conditions from entering the filament feed path, which can aid in preventing printing errors, especially when printing hygroscopic materials. As such, typically a moisture content of the filament is substantially the same when received in the print head as when entering the guide tube assembly FIG. 10 is a cross sectional view of the key or connector 250 positioned within the receptacle 252. FIG. 10 illustrates a seal between the outer surface of the key 250 with the receptacle 2522, a seal between the key 252 and the outlet end of the filament guide tube 166 and a seal between the filament 294 and the wiper seal 290. As such the key or connector 290 aids in preventing ambient conditions from entering the filament feed path, which can aid in preventing printing errors, especially when printing hygroscopic materials.

The key 180 and the key 250 have different geometric configurations in the polygonal portions thereof and the receptacles 182 and 252 have corresponding geometric configurations such that the key 180 can only be used with the receptacle 182 and the key 250 can only be used with the receptacle 252. The geometry or shape of the key 180 of the polygonal portions 194 and the receptacle 252 prevents the key 180 from being positioned in the receptacle 252. Similarly, the geometry of the key 250 and the polygonal portion 264 of and the receptacle 182 prevents the key 250 from being positioned within the receptacle 182.

While the keys 180 and 250 have been described in detail, the present disclosure is not limited to the disclosed geometric configurations of the keys 180 and 250 and corresponding receptacles 182 and 252. Rather, a connector of the present disclosure may be used in multiple geometries so as to serve as a key for connecting like filament to like print heads (for example, support material filament to support material print head, and part material filament to a part material print head), or the connector may have a singular geometry for connecting with one or more receptacles. Keys having sufficient geometric configurations or shapes and corresponding receptacles that only allow a key to be accepted into a correct receptacle and prevents the key from being accepted into an undesired receptacle is within the scope of the present disclosure. Also, in printer configurations where only a part material supply and key are needed, instead of part material and support material, the one-piece key and receptacle system can work.

Referring to FIG. 11, an exemplary consumable assembly 300 is illustrated. The consumable assembly 300 includes a filament supply 302 (the shown embodiment, this is configured as a spool-less coil of filament) within an interior space 304 of a container 308 that can be closed with a lid 306. The consumable assembly 300 includes a guide tube 310 coupled to key 180 at an outlet end thereof and coupled to the container 308 at an inlet end thereof. However, the consumable assembly 300 could alternatively be equipped with the key 250, or other configurations of keys as well. Further, the keys 180 and 250 can be used with any suitable filament feedstock supply including those loaded into bays of an additive manufacturing system. The filament feedstock supply can utilize a rotating spool or can be a spool-less design.

Although the present disclosure may have been described with reference to preferred embodiments, workers skilled in the art will recognize that changes may be made in form and detail without departing from the spirit and scope of the disclosure.

The invention claimed is:

1. An additive manufacturing system comprising:
   a 3D printer having a first and a second print head each configured to receive a filament, melt the filament, and deposit the melted filament to form a 3D part, and having a first receptacle and a second receptacle each configured for accepting a plug-in connector from a filament supply, the first and second receptacles having different geometric configurations;
   a first filament supply comprising:
     a first container configured to retain a supply of a first filament;
     a first filament guide tube having a length, the first filament guide tube comprising:
       an inlet end attached to the first container; and
       an outlet end;
     a first key having a first geometric configuration allowing the first key to be plugged into the first receptacle and comprising a conduit having an entrance and an exit, a coupling portion, and an engagement portion, wherein the entrance to the conduit is coupled to the outlet end of the first filament guide tube to thereby form a closed filament path from the first container to the 3D printer; and
   a second filament supply comprising:
     a second container configured to retain a supply of a second filament, the second filament being a different from the first filament;
     a second filament guide tube having a length, the second filament guide tube comprising:

an inlet end attached to the second container; and
an outlet end; and
a second key having a second geometric configuration allowing the second key to be plugged into the second receptacle and comprising a conduit having an entrance and an exit, a coupling portion, and an engagement portion, wherein the entrance to the conduit is coupled to the outlet end of the second filament guide tube to thereby form a closed filament path from the second container to the 3D printer, wherein allows the second key to be plugged into the second receptacle;
wherein the first geometric configuration of the first key prevents the first key from being plugged into the second receptacle and the second geometric configuration of the second key prevents the second key from being plugged into the first receptacle
wherein the first and second keys are constructed of an elastomeric material having a Shore A hardness ranging from about 30 to about 95 and the first and second keys form a seal with the first and second receptacles and substantially prevent ambient air infiltration therethrough, respectively.

2. The additive manufacturing system of claim 1, wherein portions of the first and second filament guide tubes at the outlet ends thereof are inserted into the conduits of the first and second keys, and thereby provide rigidity to the elastomeric first and second keys.

3. The additive manufacturing system of claim 1, wherein the first and second keys are of a unitary construction that forms a seal with the first and second receptacles, respectively.

4. The additive manufacturing system of claim 1, wherein the first and second keys are retained within the first and second receptacles with a frictional engagement.

5. The additive manufacturing system of claim 4, wherein the engagement portions of the first and second key have a unique shape with respect to one another which prevent each key from being plugged in to the receptacle intended to receive the other key.

6. The additive manufacturing system of claim 3, and further comprising first and second wiper seals within the conduits of the first and second keys wherein the wiper seals form seals with the first and second filaments as the filaments pass therethrough to thereby limit air transfer into the filament guide tubes.

7. The additive manufacturing system of claim 1, wherein the first and second keys each comprises a recess configured to guides a user to insert the key into its receptacle to the depth necessary to for effective engagement.

8. The additive manufacturing system of claim 7, and further comprising:
a first circuit board positioned within the recess of the first key wherein the first circuit board is retained in the recess of the first key utilizing a geometry of the recess and friction; and
a second circuit board positioned within the recess of the second key wherein the second circuit board is retained in the recess of the second key utilizing a geometry of the recess and friction.

9. A consumable assembly for supplying filament to a 3D printer having two or more receptacles having different geometric configurations, the 3D printer builds parts by material extrusion, the consumable assembly comprising:
a container configured to retain a supply of a first filament;
a first filament guide tube having a length, the first filament guide tube comprising:
an inlet end attached to the first container; and
an outlet end;
a key having a geometric configuration allowing the key to be plugged into only one receptacle of the two or more receptacles of the 3D printer, the key comprising a conduit having an entrance and an exit, a coupling portion, and an engagement portion, wherein the entrance to the conduit is coupled to the outlet end of the first filament guide tube to thereby form a closed filament path from the first container to the 3D printer, wherein the key is constructed of an elastomeric material having a Shore A hardness ranging from about 30 to about 95 and the key is configured to form a seal with one of the two or more receptacles, wherein the seal substantially prevents ambient air infiltration therethrough.

10. The consumable assembly of claim 9, wherein portions of the filament guide tube at the outlet end thereof is into the conduits of the key, and thereby provide rigidity to the elastomeric key.

11. The consumable assembly of claim 9, wherein the key is a unitary construction that forms a seal with the receptacle.

12. The consumable assembly of claim 9, wherein the key retained within the receptacle with a frictional engagement.

13. The consumable assembly of claim 12, and where the key further comprising a wiper seal within the conduit of the key wherein the wiper seals form seals with the filament as the filament passes therethrough to thereby limit air transfer into the filament guide tube.

14. The consumable assembly of claim 9, wherein the key comprises a recess configured to guide a user to insert the key into its receptacle to the depth necessary to for effective engagement.

15. The consumable assembly of claim 14, and further comprising:
a circuit board positioned within the recess of the key wherein the circuit board is retained in the recess of the key utilizing a geometry of the recess and friction.

16. A method of feeding consumable filament material to a 3D printer, the method comprising:
providing a filament supply comprising a filament coil within a container, a filament guide tube coupled to the container at an inlet end thereof, and a connector coupled to the guide tube at an outlet end thereof, wherein a conduit through the filament guide tube and the connector form a closed filament feed path;
coupling the filament supply to the 3D printer by inserting the connector into a mating receptacle of the 3D printer and forming a seal between the connector and the receptable;
feeding filament to the 3D printer by advancing filament from the filament coil along the closed filament feed path and through the connector, wherein the connector comprises:
a unitary construction of an elastomeric material having a Shore A hardness ranging from about 30 to about 95 having a through bore configured to accept an outlet end of the filament guide tube and form a seal therewith and substantially prevent ambient air infiltration therethrough and having a constricted wiper seal configured to allow the filament to pass therethrough while form a seal with the filament;
receiving the filament in the print head;
heating the filament in the print head to a flowable state; and selectively extruding the filament in the flowable state to form a 3D part.

17. The method of claim 16 wherein the seals between the connector and the receptacle, the outlet end of the filament guide tube and the connector and the connector with the filament block ambient moisture from reaching the filament while the filament travels from the filament supply to the print head.

18. The method of claim 16, wherein the filament comprises a hygroscopic material.

19. The method of claim 16, wherein moisture content of the filament is substantially the same when received in the print head as when entering the guide tube assembly.

20. The method of claim 19 and further comprising:
monitoring humidity levels along the feed path through the guide tube assembly.

21. The method of claim 16 and further comprising:
storing the filament supply in a humidity-controlled enclosure, wherein the filament is fed through the guide tube assembly directly from the enclosure.

* * * * *